US012331911B1

(12) United States Patent
Onesto

(10) Patent No.: US 12,331,911 B1
(45) Date of Patent: Jun. 17, 2025

(54) WALL LAMP

(71) Applicant: Alex Fusato, Lido di Venezia (IT)

(72) Inventor: Armando Onesto, Murano Venezia (IT)

(73) Assignee: Alex Fusato, Lido di Venezia (IT)

( * ) Notice: Subject to any disclaimer, the term of this patent is extended or adjusted under 35 U.S.C. 154(b) by 0 days.

(21) Appl. No.: 18/795,414

(22) Filed: Aug. 6, 2024

(51) Int. Cl.

| | |
|---|---|
| ***F21V 21/02*** | (2006.01) |
| ***F21S 8/00*** | (2006.01) |
| ***F21V 17/10*** | (2006.01) |
| ***F21V 17/12*** | (2006.01) |
| ***F21Y 113/00*** | (2016.01) |
| ***F21Y 115/10*** | (2016.01) |

(52) U.S. Cl.
CPC .............. *F21V 21/02* (2013.01); *F21S 8/036* (2013.01); *F21V 17/105* (2013.01); *F21V 17/12* (2013.01); *F21Y 2113/00* (2013.01); *F21Y 2115/10* (2016.08)

(58) Field of Classification Search
CPC ... F21S 8/036; F21S 8/037; F21V 17/105–12; F21V 21/00–02; F21Y 2113/00; F21Y 2115/10
See application file for complete search history.

(56) References Cited

U.S. PATENT DOCUMENTS

| | | | |
|---|---|---|---|
| 8,841,690 B1 | 9/2014 | Kim et al. | |
| 2021/0356097 A1* | 11/2021 | Vernier .................. | F21S 8/026 |
| 2022/0113001 A1 | 4/2022 | Huang et al. | |

OTHER PUBLICATIONS

European Search Report for EP 2416170 Mailed on Jun. 25, 2024.

* cited by examiner

*Primary Examiner* — Jason M Han
(74) *Attorney, Agent, or Firm* — CARMEL PATENT AGENCY; Robert Ballarini

(57) ABSTRACT

The present invention concerns an LED wall lamp capable of providing particularly omogeneous and directional lighting.

10 Claims, 5 Drawing Sheets

WALL LAMP

TECHNICAL FIELD

The present invention relates to the field of lamps, and more particularly to wall lamps of the directional type.

STATE OF THE ART

Many room lighting systems such as chandeliers, ceiling lights, wall lights, abatjours, etc. are known and commercially available today. Some of these systems are particularly suitable for use adjacent to the wall, such as ceiling lights that are placed on the ceilings of rooms or wall lights that are placed on the walls of the rooms to be illuminated.

Large retailers and lighting specialist shops now offer a wide choice of ceiling and wall lights in which the luminosity is realised by means of bulbs or LEDs and similar technology. These include, for example, LEDs spotlights that can be oriented by rotating the stem supporting the LED bulb housing and rotating said housing relative to the point of attachment of the bulb to the stem.

Hence, ceiling and wall lamps comprising spotlights in which an LED bulb or the like is installed and can be oriented by means of the support supporting the LED, thus illuminating various parts of the rooms where they are positioned.

However, when such spotlights and/or wall lights are installed in relatively large rooms, the result of the lighting will be uneven illumination, with areas that are very bright and others that are poorly lit. Furthermore, the direct light produced by LED spotlights is often too intense and may become annoying.

SUMMARY OF THE INVENTION

Therefore, the problem addressed by the present invention is to provide a wall light, such as a wall or ceiling lamp, with LEDs or the like capable of diffusing the light produced by LEDs and, at the same time, directing the diffused light produced by said source. In this way, direct LED light would be avoided and a better diffusion of light in the rooms would be created to ensure a more homogeneous lighting of the rooms. The homogeneous lighting of rooms, for the same amount of energy consumed, not only creates a situation of better comfort for the occupants, but also allows for better illumination of parts of the rooms that would otherwise remain in semi-darkness or darkness. In fact, the fact that the lamp offers the possibility not only to diffuse the light produced by a LED source, but also to direct the diffused light produced, makes it possible to illuminate even the most distant parts of the room from the lamp.

Furthermore, as an additional advantage, one would like to have a wall lamp that can be used either as a wall or ceiling light, rather than in any other possible application on a wall or equivalent surface.

Finally, as a further advantage, one would like to have a wall lamp with high energy efficiency, relatively low energy consumption and thus more eco-friendly.

Finally, as a further technical problem, one would like a lamp that not only diffuses light but also allows diffused light to be directed in any direction, i.e., around an axis, 360 degrees.

Such problems are solved by the wall lamp of the present invention, as outlined in the appended claims, definitions of which form an integral part of the present description.

More particularly, the invention relates to a wall lamp (1) suitable for use in room lighting.

Further features and advantages of the lamp of the invention will result from the description of the examples of embodiments of the invention and the figures, provided as an indication of the invention.

BRIEF DESCRIPTION OF THE FIGURES

Below is a list of the numbers pertaining to the various figures with the name of each numbered element.

(1) Wall lamp,
(2) Flat base,
(3) Series of LEDs, micro-LEDs or OLEDs
(4) Through-hole,
(5) Threaded part of a screw (22),
(6) Head of screw (22),
(7) First cavity,
(8) Translucent cover,
(9) Second cavity,
(10) Flat support,
(11) Through-hole,
(12) First support element,
(13) Base of first support element (12),
(14) Base of first support element (12), opposite base (13),
(15) Cavity in the form of a partial hemisphere,
(16) Magnetic sphere,
(17) Second supporting element base,
(18) Base of second support element (17),
(19) Cavity in the shape of a partial hemisphere,
(20) Base of second support element (17), opposite base (18),
(21) Flat element,
(22) Screw,
(23) Hole in the cavities in the shape of a partial hemisphere (15) and (19),
(24) Hole in the base (13) of the first support element (12).

DETAILED DESCRIPTION OF THE INVENTION

Figure 1:
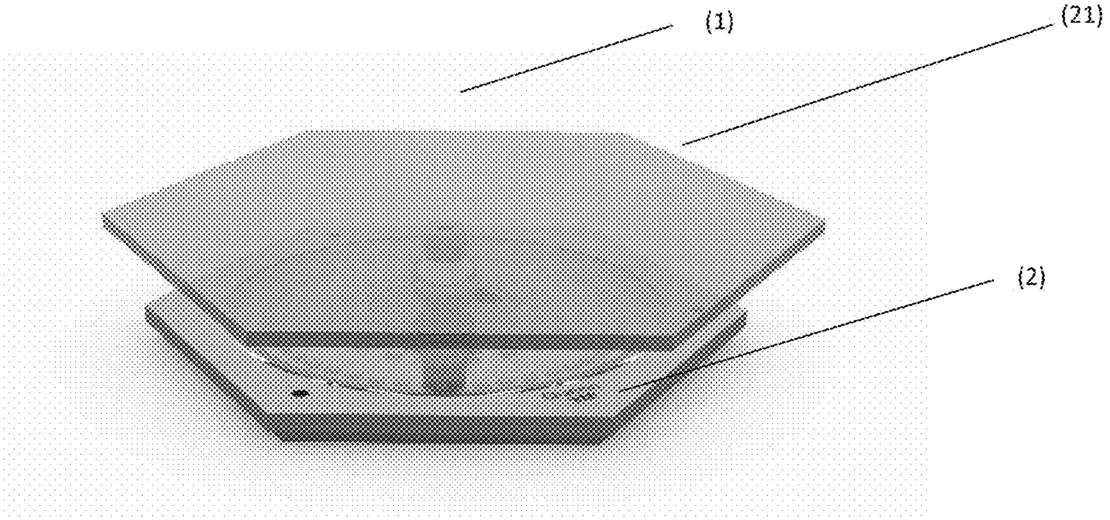
FIG. 1 shows a front perspective view of the wall lamp (1) of the invention, incorporating the features of the invention, according to a form of embodiment of the invention, in particular, the flat base (2) and the flat element (21).
Figure 2:
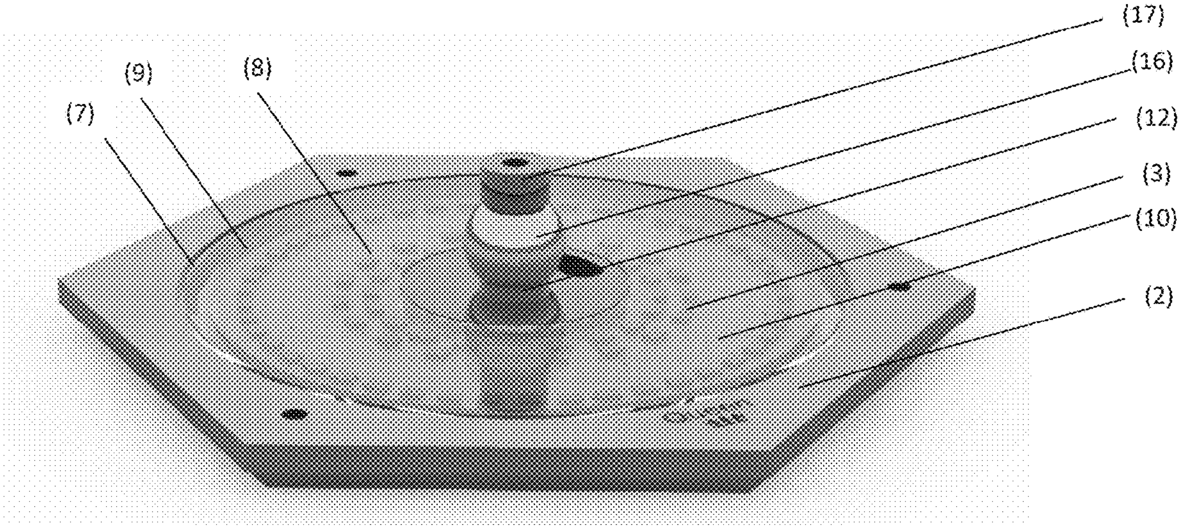
FIG. 2 shows a front perspective view of the wall lamp (1) of the invention, according to a form of embodiment, but without the flat element (21) so as to show the other elements included in the lamp (1).

For the purposes of the description herein, the terms "upper", "lower", "right", "left", "rear", "front", "vertical", "horizontal" and derivatives thereof refer to the oriented concepts of FIG. 1.

However, it should be understood that the concepts may take various alternative orientations, except where expressly stated otherwise.

As used herein, the term “and/or”, when used in a list of two or more articles, means that any one of the listed articles may be employed alone, or in any combination of two or more of the listed articles.

For example, if a combination of items is described as containing components A, B and/or C, the combination may contain only A; only B; only C; A and B in combination; A and C in combination; B and C in combination; or A, B and C in combination.

The terms “includes”, “comprising” or any variation thereof are intended to cover a non-exclusive inclusion, such that a device, apparatus or use comprising a list of elements does not include only those elements but may include other elements not expressly listed or inherent in that device, apparatus or use.

An element followed by “comprising . . . a . . . ” does not preclude, without further constraint, the existence of further identical elements in the apparatus, device, or use comprising the element.

An object of the present invention is a wall lamp (1) comprising:

- a flat base (2) suitable for fixing on a wall or equivalent support by means of fixings, where said base (2) has:
  - a) a through-hole (4), where said through-hole (4) is arranged perpendicularly and perpendicularly to the centre of the flat base (2) and is capable of being passed through by the threaded part (5) of a screw (22), and where said through-hole does not allow the passage of the head (6) of the screw (22) which remains retained on the flat base (2),
  - b) a first cavity (7) extending all around the centre of the flat base (2) and having a depth of between 0.5 and 3 mm and being configured to completely accommodate a translucent cover (8) suitable for allowing the passage of light, wherein said translucent cover (8) is fixed to the flat base (2) by means of fixing means,
  - c) a second cavity (9) extending all around the centre of the flat base (2) and having a depth of between 2 and 10 mm and being arranged completely within the first cavity (7) and being configured to accommodate a flat support (10), wherein an array of LEDs, micro-LEDs or OLEDs (3) is positioned on said flat support (10) and wherein said flat support (10) is configured to receive the power supply,
  - (d) a through-hole (11) for passing the power supply wires from the channels of the wall or equivalent support to the second cavity (9),
- a screw (22) having a threaded part (5) and a head (6),
- a translucent cover (8) capable of allowing light to pass through and configured to be completely housed within the first cavity (7),
- a flat support element (10), wherein an array of LEDs, micro-LEDs or OLEDs (3) is positioned on said flat support element (10) and wherein said flat support element (10) is configured to receive the power supply and is configured to be completely housed within the second cavity (9),
- a first support element (12) having a cylindrical, parallelopiped or cubic shape, wherein said base (13) has a hole (24) configured to at least partially accommodate the threaded portion (5) of said screw (22) so that said first support element (12) is stably fixed on said flat base (2), and wherein the base (14) of said first support element (12), opposite to the base (13), has a cavity in the shape of a partial hemisphere (15) configured to partially accommodate the hemispherical part of a magnetic sphere (16), and wherein the cavity (15) is made of at least partially ferrous material,
- a second support element (17) having a cylindrical, parallelopiped or cubic form, wherein the base (18) has a cavity in the form of a partial hemisphere (19) configured to partially accommodate the hemispherical part of a magnetic sphere (16), and wherein the cavity (19) is made of an at least partially ferrous material, and wherein the base (20) of said second support element (17), opposite to the base (18), is adapted to be fixed to a plane element (21),
- a magnetic sphere (16) adapted to be partially housed simultaneously in both the partial hemisphere-shaped cavity (15) of said first support element (12) and in the partial hemisphere-shaped cavity (19) of said second support element (17),
- a flat element (21) made of glass or plastic material suitable for being fixed to the base (20) of the second support element (17) and wherein said flat element (21) is capable of being passed through, at least partially, by light.

Indeed, it has been surprisingly found that the assembly of the constituent elements of the lamp (1) permits, on the one hand, to diffuse the light produced by LEDs and, at the same time, to direct the diffused light produced by said source. In fact, the light produced by the LEDs or the like would first be diffused by the translucent cover (8) and then, said diffused light, passing through on the flat element (21), which is directional, allows for the direction of the diffused light. In this way, direct LED light is actually avoided and a better diffusion of light into the rooms is created, thus ensuring a more homogeneous illumination of the rooms. This effect is particularly evident with LEDs and similar light sources.

The wall light (1) was found to be equally suitable for use as a wall or ceiling light, as well as in any other possible application on walls or equivalent surfaces. The wall lamp (1) proved to be usable indifferently as a ceiling and/or wall lamp.

Furthermore, thanks to the magnetic sphere (16) and its support elements partially housing said sphere, the lamp (1) allows the diffused light to be directed in any direction, in particular it can be directed, around an axis, as much as 360 degrees.

The magnetic sphere (16), thanks to the magnetic force, keeps the first support element (12) and the second support element (17), and the other lamp components linked or connected thereto, such as, for example, the flat base element (21), assembled.

The flat base (2) can have different shapes, for example, square, rectangular, circular, elliptical, hexagonal, trapezoidal, rhombic, etc.

According to a preferred embodiment, the flat base (2) has a hexagonal shape. Such a shape allows further identical lamps to be coupled together, generating a series of lamps close to each other and with no gaps between them.

The flat element (21) can have various shapes, for example, square, rectangular, circular, elliptical, hexagonal, trapezoidal, rhombic, etc.

According to a preferred form of realisation, the flat element (21) has a hexagonal shape, (see FIG. 1). Such a shape allows further identical lamps to be coupled together, generating a series of lamps close to each other with no gaps between them (see FIG. 7).

Figure 7:
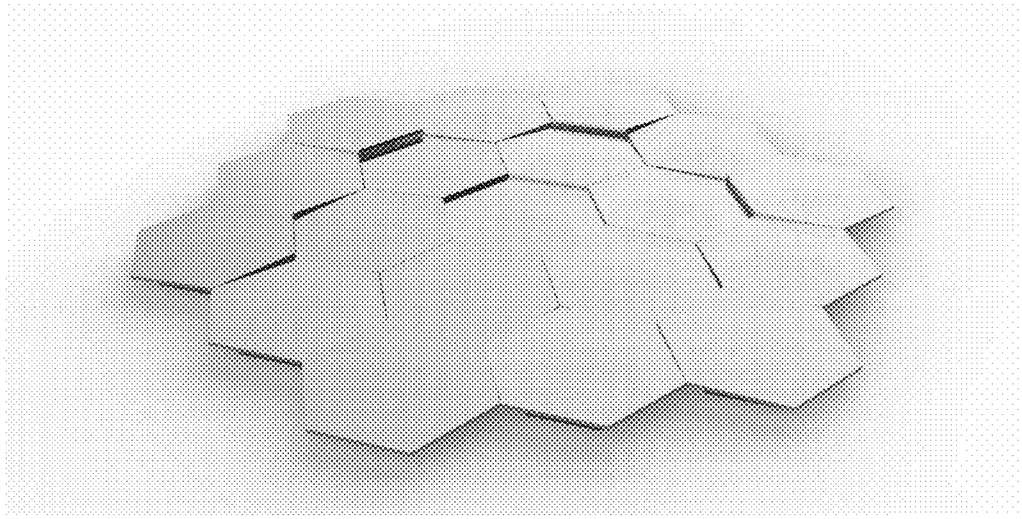
Figure 8:
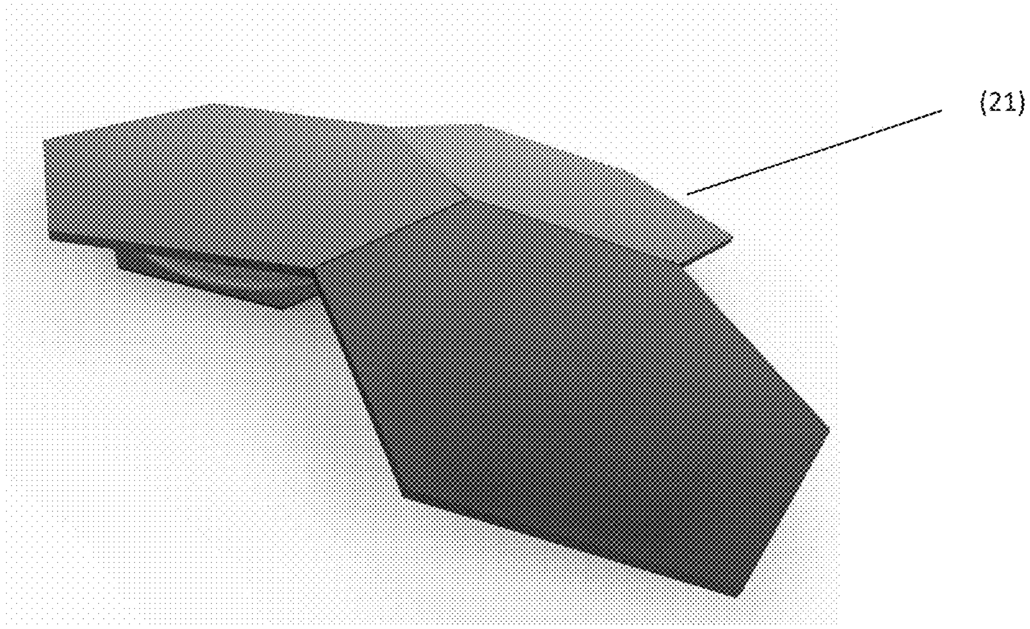
Figure 9:
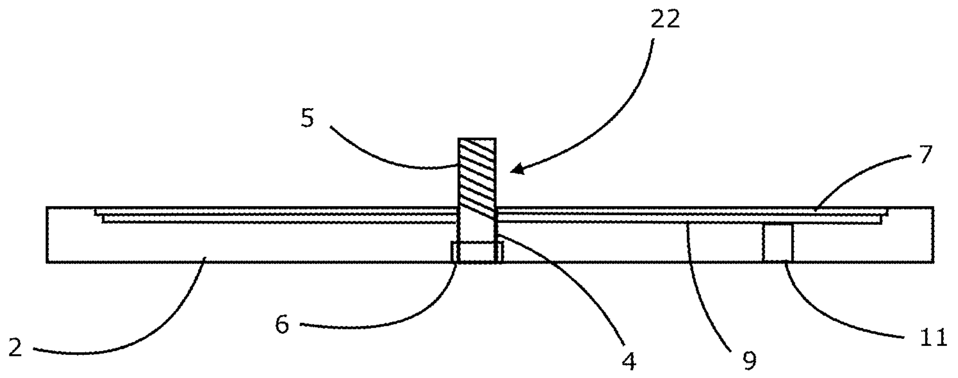
FIG. 9 is a schematic cross section of the flat base 2 of FIG. 2, taken along a center line.

According to a preferred embodiment, the flat base (2) and/or the flat element (21) has a hexagonal shape (See FIG. 1 and FIG. 7).

The flat element (21) is capable of being crossed, at least partially, by light.

Therefore, the plane element (21) can be completely traversed by light, for example, if the plane element (21) is colourless and transparent, or, the plane element (21) can be traversed only partially by light.

According to a preferred form of embodiment, the plane element (21), in addition to being capable of being crossed, at least partially, by light, is capable of reflecting, at least partially, light.

According to a preferred form of realisation, the flat element (21), in addition to being capable of being traversed by about 70 percent of the light, is also capable of reflecting about 30 percent of the light produced by the LEDs. Such a configuration makes it possible to achieve optimal diffusion effects of the light produced by the LEDs, which, as already mentioned, produce a cone of light with little blurring, i.e. primarily directed in the direction perpendicular to the LED, with only slight diffusion of light in the other directions. This configuration can be realised by means of a semi-transparent mirror surface of the plane element (21).

Thus, according to a preferred embodiment, the flat element (21) has a semi-transparent mirror surface or, the flat element (21) has both a translucent and a partially reflective surface. Said configuration allows a part of the light to radiate directly from the plane element (21), and also, another part of it to be reflected, thereby creating both direct light and reflected light simultaneously.

Therefore, according to a preferred embodiment, the plane element (21) is apt to be crossed by about 70% of the light produced by the LEDs thus generating about 70% of direct type light and is apt to reflect about 30% of the light, thus generating about 30% of indirect type light i.e. diffuse light.

By its nature, direct light is always point-like, indirect light blurred.

The first cavity (7) and/or the second cavity (9) of the flat base (2) extend all around the centre of the flat base (2) according to a circular shape, a shape of a circle, according to the shape of a disc with a void in the centre, or according to a square, triangular, rhombic or rectangular shape.

Preferably, the first cavity (7) and the second cavity (9) of the flat base (2) are coaxial. More preferably, the first cavity (7) and the second cavity (9) of the flat base (2) are coaxial and their axis is coaxial with the through-hole (4) disposed perpendicularly and centrally to the flat base (2).

According to a preferred embodiment, the first cavity (7) and the second cavity (9) of the flat base (2) extend all around the centre of the flat base (2) according to a circular shape, a shape of a circumference or according to the shape of a disc having a void at its centre.

The first cavity (7) and the second cavity (9) of the plane base (2) are plane cavities and are parallel to the horizontal plane of the base (2).

According to a preferred form of embodiment, the first cavity (7) extends all around the centre of the flat base (2) and having a depth of between 1 and 2.5 mm and being configured to completely accommodate a translucent cover (8) suitable for allowing the passage of light, wherein said translucent cover (8) is fixed to the flat base (2) by means of fixing means.

In accordance with a preferred embodiment, the second cavity (9) extends all around the centre of the flat base (2) and having a depth of between 4 and 6 mm and being arranged completely within the first cavity (7) and being configured to accommodate a flat support (10), wherein an array of LEDs, micro-LEDs or OLEDs (3) is positioned on said flat support (10) and wherein said flat support (10) is configured to receive the power supply.

The second cavity (9) has a width of from 50% to 90%, preferably from 75% to 90%, with respect to the width of the first cavity (7), wherein said width is measured in the horizontal direction extending from the centre of said flat base (2) towards the outside of said flat base (2).

According to a more preferred embodiment, the second cavity (9) has a width of between 40% and 70% with respect to the width of the first cavity (7), wherein said width is measured in the horizontal direction extending from the centre of said flat base (2) towards the outside of said flat base (2).

The base (14) of the first support element (12) is spaced by a length of from 3 to 10 mm from the base (18) of the second support element (17) wherein the base (14) and the base (18) are arranged parallel to each other, and wherein said spacing is achieved by means of a magnetic sphere (16) of suitable diameter arranged at least partially both within the cavity in the form of a partial hemisphere (15) and within the cavity in the form of a partial hemisphere (19).

According to a preferred embodiment, the base (14) of the support element (12) is spaced by a length of 6 mm from the base (18) of the second support element (17) when the base (14) and the base (18) are arranged parallel to each other.

According to a preferred form of embodiment, the magnetic sphere (16) and/or the partial hemisphere-shaped cavities (15) and (19) have a surface finish suitable to impart friction between the magnetic sphere (16) and the partial hemisphere-shaped cavities (15) and (19).

According to a more preferred form of embodiment, such a preferred form of embodiment allows the second support element (17) to be held more firmly in place so that, although gravity is inherent on the planar element (21) attached thereto, thanks to such a form of embodiment, the support element (17) remains stationary on the magnetic sphere (16).

According to a more preferred embodiment, the cavities in the shape of a partial hemisphere (15) and (19) have at the bottom and in the centre of their diameter a hole (23) having a diameter of from 30% to 80% with respect to the diameter of the cavities in the shape of a partial hemisphere (15) and (19). More preferably, the diameter of the hole (23) is from 40% to 60% with respect to the diameter of the cavities.

Figure 3:
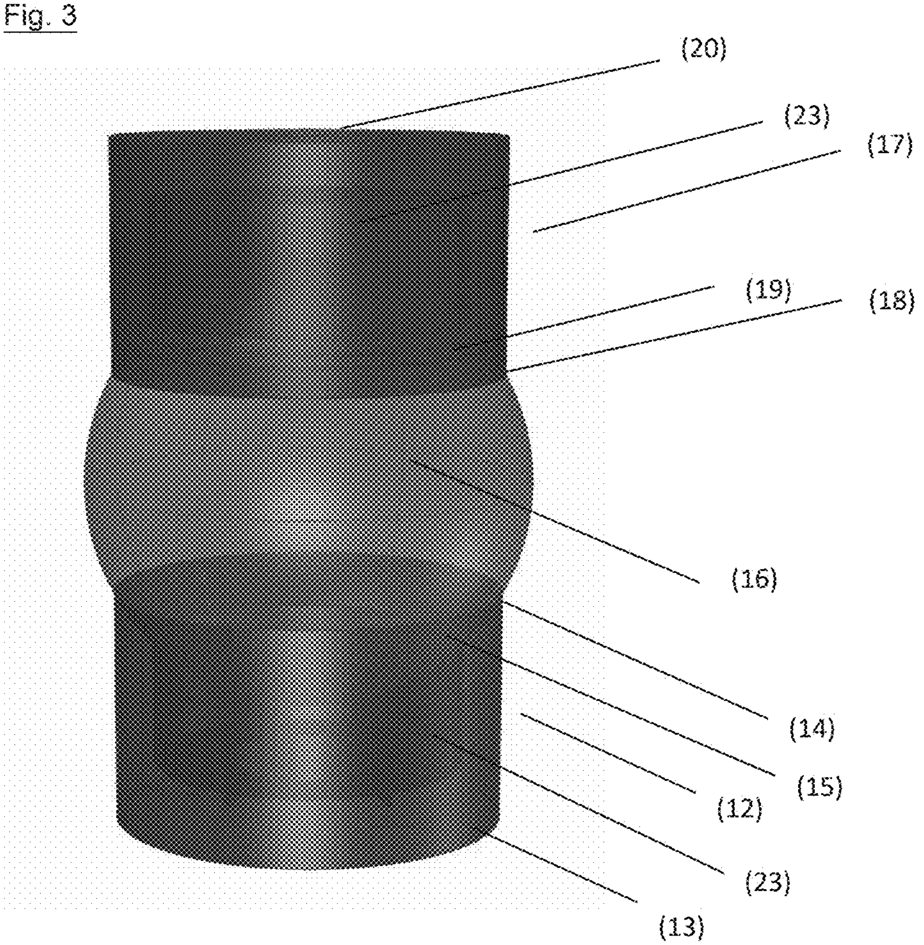
FIGS. 3, 4 and 5 show a semi-frontal perspective view, of a preferred form of embodiment of the invention, comprising, in particular, the hole (23) within the first support element (12) and the second support element (17), showing the assembly that is made between said elements and the magnetic ball (16).
Figure 4:
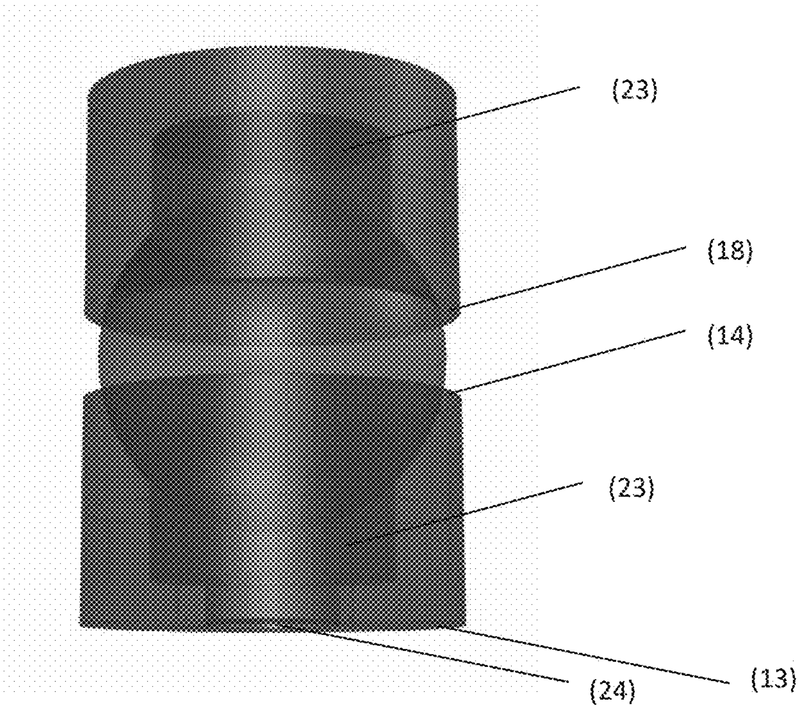
Figure 5:
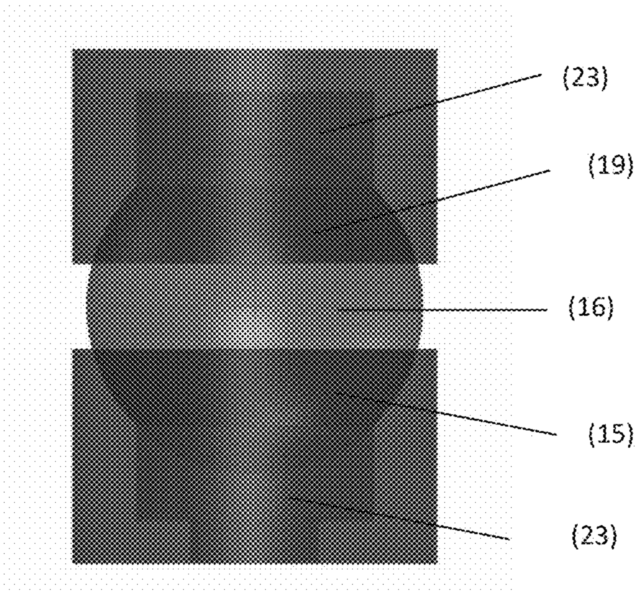
Figure 6:
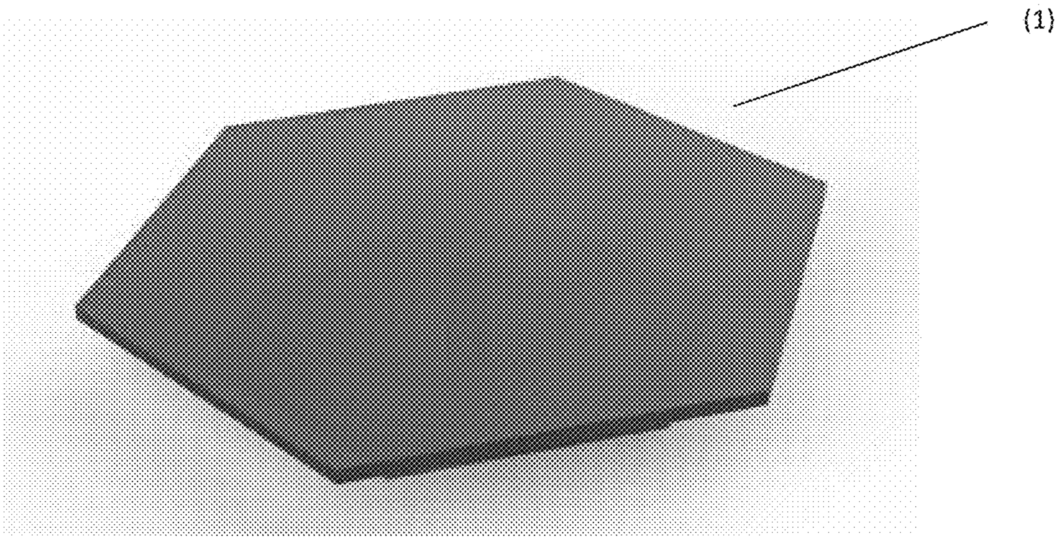
FIGS. 6, 7 and 8 show the lamp of the invention (1) assembled with other similar lamps (1) to form structures with three or many lamps (1) side by side. Such preferred embodiments are implemented in situations where there is a need for large diffused light, for example, to homogeneously illuminate large halls of palaces and villas, such as, by way of example, the large halls of sumptuous Venetian palaces.

According to this embodiment, in fact, the edge created between the cavity in the shape of a partial hemisphere (15) and (19) and the hole (23) in the centre of its diameter contributes to realising friction between the cavity and the magnetic sphere (16) and thus helps to hold the magnetic sphere (16) stationary. The edge between the bases (14) and (18) of the support elements and their corresponding cavities in the form of a partial hemisphere (15) and (19) also contributes and generates the friction necessary to hold the magnetic sphere (16) stationary. However, this form of realisation with two edges that realise the friction between the cavities (15) and (19) and the magnetic sphere (16) (see FIGS. 3, 4 and 5) is particularly preferred as it allows even the heaviest flat elements (21) to remain in the desired position even when, for example, they are heavy and are arranged vertically and thus when the force of gravity would tend to make them spontaneously lower.

The magnetic sphere (16) realises a holding force of between 4 kg and 10 kg.

According to a preferred embodiment, wherein the magnetic ball (16) realises a holding force of between 6 Kg and 8 Kg.

The magnetic ball (16) has a diameter of between 5 and 100 mm, preferably between 8 and 50 mm, more preferably between 10 and 20 mm, even more preferably between 12 and 14 mm.

According to a preferred embodiment, the flat base (2) and the flat element (21) have a hexagonal shape, are of equal size and are arranged specularly one above the other and wherein said lamp (1) is positioned at a distance of 0.1 to 0.2 mm from another lamp (1) having the same characteristics.

The translucent cover (8) suitable for allowing light to pass through may suitably be made of Plexiglass, glass or other material compatible with the light emission of the LEDs. Preferably, the translucent cover (8) is made of Plexiglass.

The illumination of the lamp is realised with LEDs and derivatives thereof, as said light sources have the advantage of not producing significant thermal emissions and therefore do not excessively heat the lamp.

The flat element (21) may be made of glass or of plastic material and is capable of being passed through, at least partially, by light.

Preferably said plane element (21) is made of opaque glass, dark glass, glass with a semi-transparent mirror finish, etc. According to a more preferred embodiment said flat element (21) is made of glass with a semi-transparent mirror finish. Such a finish allows the best possible diffusion of light.

The assembly of the flat element (21) on the base (20) of the second support element (17) may be conveniently carried out by means of adhesives, preferably, for example, by means of two-component epoxy adhesives.

In order to carry out the assembly of the flat element (21) on the base (20) of the second support element (17), a template or guide can be conveniently used, which allows the assembly in a precise position of the flat element (21).

Such an assembly is particularly important when, according to a preferred embodiment, the flat base (2) and the flat element (21) have a hexagonal shape, are of equal size and are arranged specularly one above the other and where said lamp (1) is positioned at a distance of 0.1 to 0.2 mm from another lamp (1) having the same characteristics. Indeed, in such a case, any error in the positioning of the flat element (21) on the base (20) of the second support element (17), means that the different flat elements (21) cannot be adjacent when the lamps are positioned.

The LEDs are powered at 220 Volts, and, preferably, produce a light output of 500 Lumen. The lamp (1) plus comprise from 1 to 1000 LEDS or the like, preferably from 10 to 100 LEDS, more preferably from 20 to 50 LEDs.

The wall lamp (1) of the present invention can be conveniently used on the wall, thus as a wall sconce, and/or on the ceiling, thus as a ceiling light, thus being a particularly versatile lamp.

The wall lamp (1) can be arranged near and/or adjacent to other wall lamps (1) realising interesting visual effects in terms of illumination.

Although the present invention will be described with reference to the individual embodiment forms shown in the figures, it should be understood that the present invention can be embodied in many alternative embodiment forms. In addition, any possible size, shape or type of elements or materials.

All of the individual pieces constituting the wall lamp (1) are commercially and individually available on any major commercial online trading platform and, given the figures shown herein, their assembly requires no further inventive effort.

The invention claimed is:

1. Wall lamp comprising:

a flat base suitable for fixing on a wall or equivalent support by means of fixings, where said flat base comprises:

a through-hole, where said through-hole is arranged perpendicularly and perpendicularly to the center of the flat base and is capable of being passed through by a threaded part of a screw, and where said through-hole does not allow the passage of a head of the screw which remains retained on the flat base, a first cavity extending all around the center of the flat base and having a depth of between 0.5 and 3 mm and being configured to completely accommodate a translucent cover suitable for allowing the passage of light, wherein said translucent cover is fixed to the flat base by means of fixing means, a second cavity extending all around the center of the flat base and having a depth of between 2 and 10 mm and being arranged completely within the first cavity and being configured to accommodate a flat support, wherein an array of LEDs, micro-LEDs or OLEDs is positioned on said flat support and wherein said flat support is configured to receive the power supply, and is configured to be completely housed within the second cavity, a through-hole for passing the power supply wires from channels of the wall or equivalent support to the second cavity, a translucent cover capable of allowing light to pass through and configured to be completely housed within the first cavity, a first support element having a cylindrical, parallelopiped or cubic shaped base, wherein said base has a hole configured to at least partially accommodate the threaded portion of said screw so that said first support element is stably fixed on said flat base, and wherein a seat of said first support element, opposite to the base, has a cavity in the shape of a partial hemisphere configured to partially accommodate the hemispherical part of a magnetic sphere, and wherein the cavity is made of at least partially ferrous material, a second support element having a cylindrical, parallelopiped or cubic form base, wherein a seat of the second support element has a cavity in the form of a partial hemisphere configured to partially accommodate the hemispherical part of the magnetic sphere, and wherein the cavity is made of an at least partially ferrous material, and wherein the base of said second support element, opposite to the seat of the second support element, is adapted to be fixed to a plane element, the magnetic sphere being configured to be partially housed simultaneously in both the partial hemisphere-shaped cavity of said first support element and in the partial hemisphere-shaped cavity of said second support element, the plane element being made of glass or plastic material suitable for being fixed to the base of the second support element and wherein said plane element is capable of being passed through, at least partially, by light.

2. The wall lamp according to claim 1, wherein the flat base and/or the plane element has a hexagonal shape.

3. The wall lamp according to claim 1, wherein the first cavity and the second cavity of the flat base extend all around the center of the flat base according to a circular shape, a shape of a circumference or according to the shape of a disc having a void in the center.

4. The wall lamp according to claim 1, wherein the second cavity has a width of from 50% to 90% with respect to the width of the first cavity, wherein said width is measured in the horizontal direction extending from the center of the flat base towards the outside of said flat base.

5. The wall lamp according to claim 1, wherein
 the base of the first support element is spaced by a length of from 3 to 10 mm from the base of the second support element when the base and the base are arranged parallel to each other, and wherein said spacing is realized by means of the magnetic sphere of suitable diameter arranged at least partially both inside the cavity in the shape of a partial hemisphere and inside the cavity in the shape of a partial hemisphere.

6. The wall lamp according to claim 5, wherein the base of the support element is spaced by a length of 6 mm from the base of the second support element when the base and the base are arranged parallel to each other.

7. The wall lamp according to claim 1, wherein the magnetic sphere and/or the cavities in the shape of a partial hemisphere and have a surface finish capable of conferring friction between the magnetic sphere and the cavities in the shape of a partial hemisphere and.

8. The wall lamp according to claim 1, wherein the cavities in the shape of a partial hemisphere and have at the bottom and in the center of their diameter a hole having a diameter of from 30% to 80% of the diameter of the cavities in the shape of a partial hemisphere and.

9. The wall lamp according to claim 1, wherein the plane element, in addition to being capable of being crossed by about 70% of the light, is capable of reflecting about 30% of the light produced by the LEDS.

10. The wall lamp according to claim 1, wherein the flat base and the plane element have a hexagonal shape, are of equal size and are arranged specularly one above the other, and wherein said lamp is positioned at a distance of 0.1 to 0.2 mm from another lamp having the same characteristics.

* * * * *